US012784983B2

(12) United States Patent
Kang et al.

(10) Patent No.: US 12,784,983 B2
(45) Date of Patent: Nov. 3, 2026

(54) MULTILAYER ELECTRONIC COMPONENT

(71) Applicant: SAMSUNG ELECTRO-MECHANICS CO., LTD., Suwon-si (KR)

(72) Inventors: Dong Ha Kang, Suwon-si (KR); Hye Min Bang, Suwon-si (KR); Hye Young Choi, Suwon-si (KR); Bum Suk Kang, Suwon-si (KR); Hyun Hee Gu, Suwon-si (KR); Byung Jun Jeon, Suwon-si (KR); Hong Seok Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 206 days.

(21) Appl. No.: 18/894,678

(22) Filed: Sep. 24, 2024

(65) Prior Publication Data

US 2025/0166912 A1 May 22, 2025

(30) Foreign Application Priority Data

Nov. 20, 2023 (KR) ........................ 10-2023-0161318

(51) Int. Cl.
*H01G 4/232* (2006.01)
*H01G 4/012* (2006.01)
*H01G 4/30* (2006.01)

(52) U.S. Cl.
CPC ........... *H01G 4/2325* (2013.01); *H01G 4/012* (2013.01); *H01G 4/30* (2013.01)

(58) Field of Classification Search
CPC ......... H01G 4/2325; H01G 4/012; H01G 4/30
See application file for complete search history.

(56) References Cited

U.S. PATENT DOCUMENTS 10,930,436 B2 2/2021 Arai et al.
2004/0119579 A1 6/2004 Takehana et al.
(Continued)

FOREIGN PATENT DOCUMENTS

CN 115621043 A 1/2023
JP 2002-008938 A 1/2002
(Continued)

OTHER PUBLICATIONS

Extended European Search Report dated Sep. 15, 2025 issued in the corresponding European Patent Application No. 24202183.0.

*Primary Examiner* — Michael P Mcfadden
(74) *Attorney, Agent, or Firm* — Morgan, Lewis & Bockius LLP

(57) ABSTRACT

A multilayer electronic component includes a body including a dielectric layer and an internal electrode alternately disposed with the dielectric layer; an interfacial plating layer disposed at an end of the internal electrode and including one or more B and P and Ni; and an external electrode disposed to cover the interfacial plating layer and including an electrode layer including glass containing Si and Al and a conductive metal, wherein the electrode layer includes an inner region adjacent to the interfacial plating layer and an outer region disposed on the inner region, and an area fraction of the glass included in the inner region may be higher than an area fraction of the glass included in the outer region.

16 Claims, 7 Drawing Sheets

K1

(56) References Cited

U.S. PATENT DOCUMENTS

| | | | | |
|---|---|---|---|---|
| 2007/0109718 | A1* | 5/2007 | Horie | H01G 4/30 361/306.3 |
| 2007/0176521 | A1 | 8/2007 | Nakamura | |
| 2010/0091426 | A1* | 4/2010 | Motoki | H01C 7/18 29/25.42 |
| 2014/0347783 | A1 | 11/2014 | Kisumi et al. | |
| 2015/0279570 | A1 | 10/2015 | Koga et al. | |
| 2016/0071647 | A1 | 3/2016 | Nishisaka et al. | |
| 2016/0087189 | A1* | 3/2016 | Lee | H01G 4/30 29/25.35 |
| 2016/0268046 | A1* | 9/2016 | Nishisaka | H01G 4/232 |
| 2018/0096791 | A1 | 4/2018 | Nishisaka et al. | |
| 2021/0142947 | A1 | 5/2021 | Teraoka et al. | |
| 2022/0013295 | A1 | 1/2022 | Nishisaka et al. | |
| 2023/0034900 | A1 | 2/2023 | Iguchi et al. | |
| 2023/0133669 | A1 | 5/2023 | Yoon et al. | |
| 2023/0290573 | A1 | 9/2023 | Nakamura et al. | |
| 2023/0352245 | A1 | 11/2023 | Inomata et al. | |
| 2024/0177933 | A1* | 5/2024 | Lee | H01G 4/12 |
| 2024/0177934 | A1* | 5/2024 | Park | H01G 4/008 |

FOREIGN PATENT DOCUMENTS

| | | | |
|---|---|---|---|
| JP | 2004-214643 | A | 7/2004 |
| JP | 3835218 | B2 | 10/2006 |
| JP | 4493619 | B2 | 6/2010 |
| JP | 2016-058719 | A | 4/2016 |
| JP | 2018-060875 | A | 4/2018 |
| JP | 2022-014535 | A | 1/2022 |
| JP | 2023-161393 | A | 11/2023 |
| KR | 10-2023-0062023 | A | 5/2023 |
| WO | 2014/097701 | A1 | 6/2014 |

* cited by examiner

MULTILAYER ELECTRONIC COMPONENT

CROSS-REFERENCE TO RELATED APPLICATION(S)

This application claims benefit of priority to Korean Patent Application No. 10-2023-0161318 filed on Nov. 20, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted on a board, and may thus be used as a component of various electronic devices.

Recently, as electronic devices have a smaller size and higher performance, a multilayer ceramic capacitor is also trending toward miniaturization and higher capacitance. Accordingly, the importance of ensuring high reliability of a multilayer ceramic capacitor is increasing.

In order to miniaturize such a multilayer ceramic capacitor, there is a trend to reduce a thickness of an external electrode, and even if the thickness of the external electrode is reduced, a method to ensure the reliability in a high temperature and high humidity environment is required.

SUMMARY

An aspect of the present disclosure is to provide a multilayer electronic component having excellent reliability.

An aspect of the present disclosure is to improve electrical connectivity between an internal electrode and an external electrode.

An aspect of the present disclosure is to improve capacitance per unit volume of a multilayer electronic component.

However, the purpose of the present disclosure is not limited to the above-described content, and may be more easily understood in the process of explaining specific embodiments of the present disclosure.

According to an aspect of the present disclosure, a multilayer electronic component may include: a body including a dielectric layer and an internal electrode alternately disposed with the dielectric layer, an interfacial plating layer disposed at an end of the internal electrode; and an external electrode disposed to cover the interfacial plating layer and including an electrode layer including glass containing Si and Al and a conductive metal, wherein the electrode layer includes an inner region adjacent to the interfacial plating layer and an outer region disposed on the inner region, and an area fraction of the glass included in the inner region may be higher than an area fraction of the glass included in the outer region.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
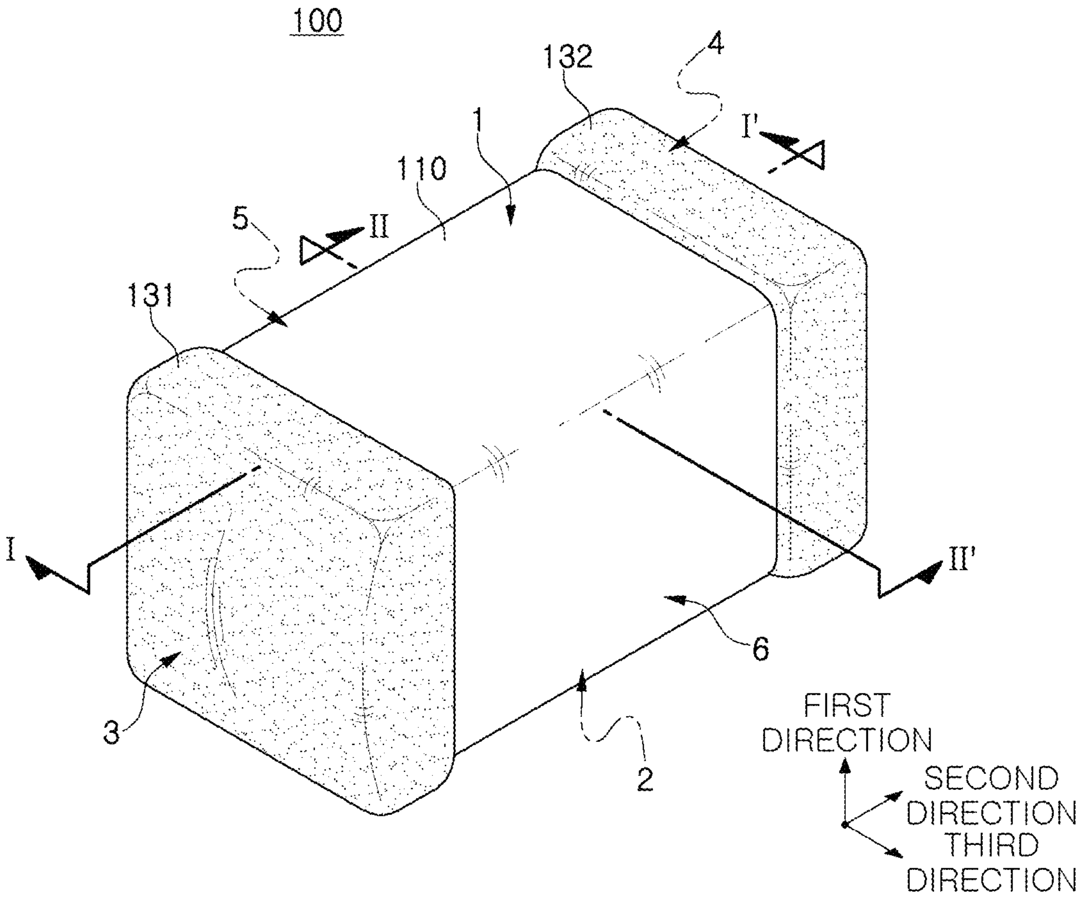
FIG. 1 schematically illustrates a perspective view of a multilayer electronic component according to an embodiment of the present disclosure.

Hereinafter, some embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numerals are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a stacking direction or a thickness (T) direction, a second direction may refer to a length (L) direction, and a third direction may refer to a width (W) direction.

Multilayer Electronic Component

FIG. 1 schematically illustrates a perspective view of a multilayer electronic component according to an embodiment of the present disclosure.

Figure 2:
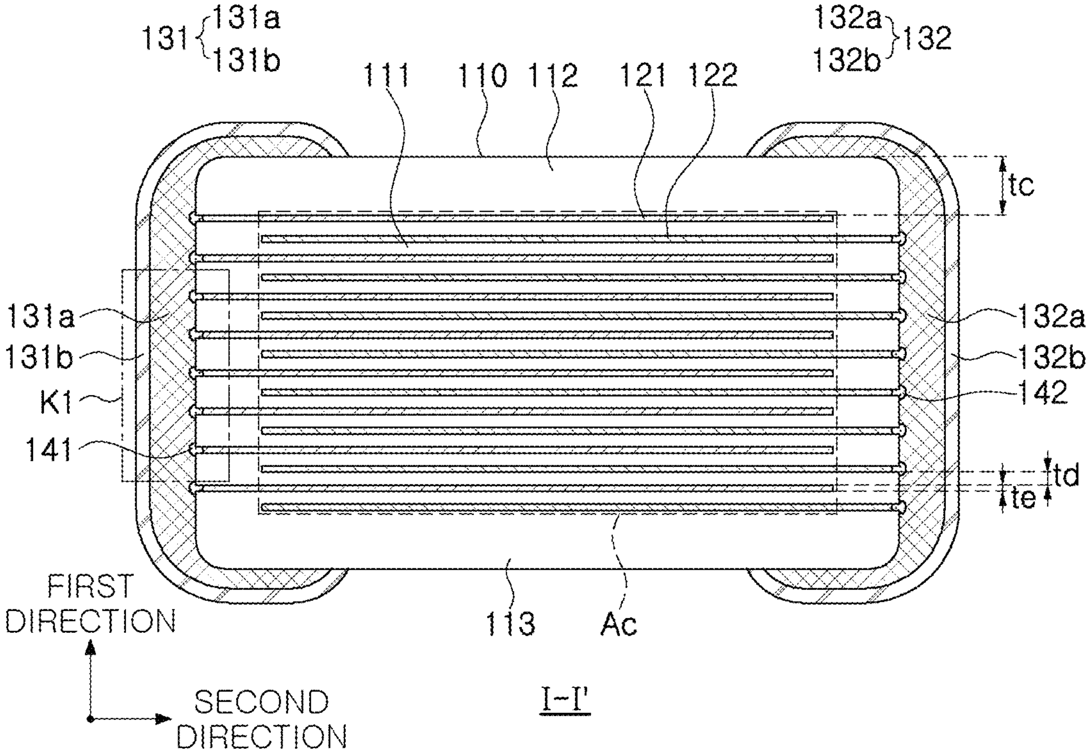
FIG. 2 schematically illustrates a cross-sectional view taken along line I-I' of FIG. 1.

FIG. 2 schematically illustrates a cross-sectional view taken along line I-I' of FIG. 1.

Figure 3:
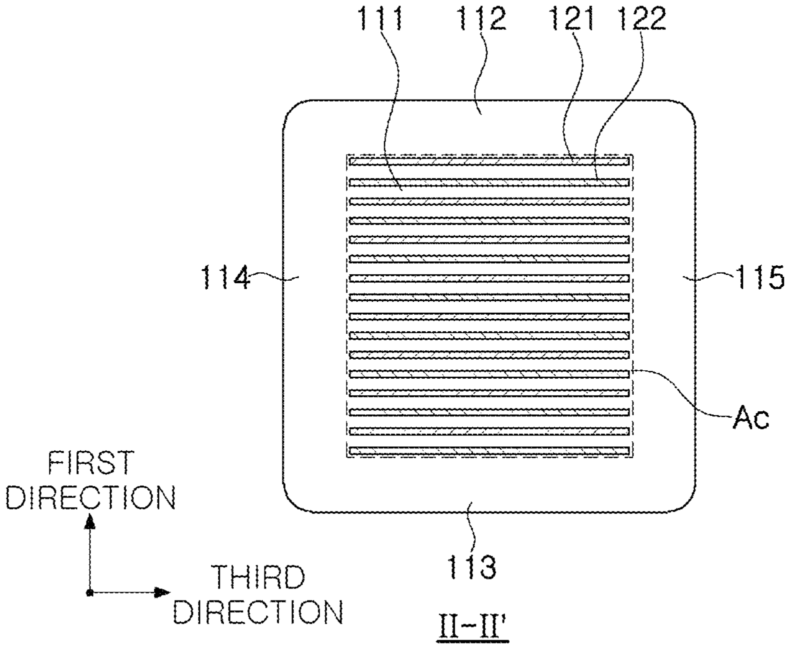
FIG. 3 schematically illustrates a cross-sectional view taken along line II-II' of FIG. 1.

FIG. 3 schematically illustrates a cross-sectional view taken along line II-II' of FIG. 1.

Figure 4:
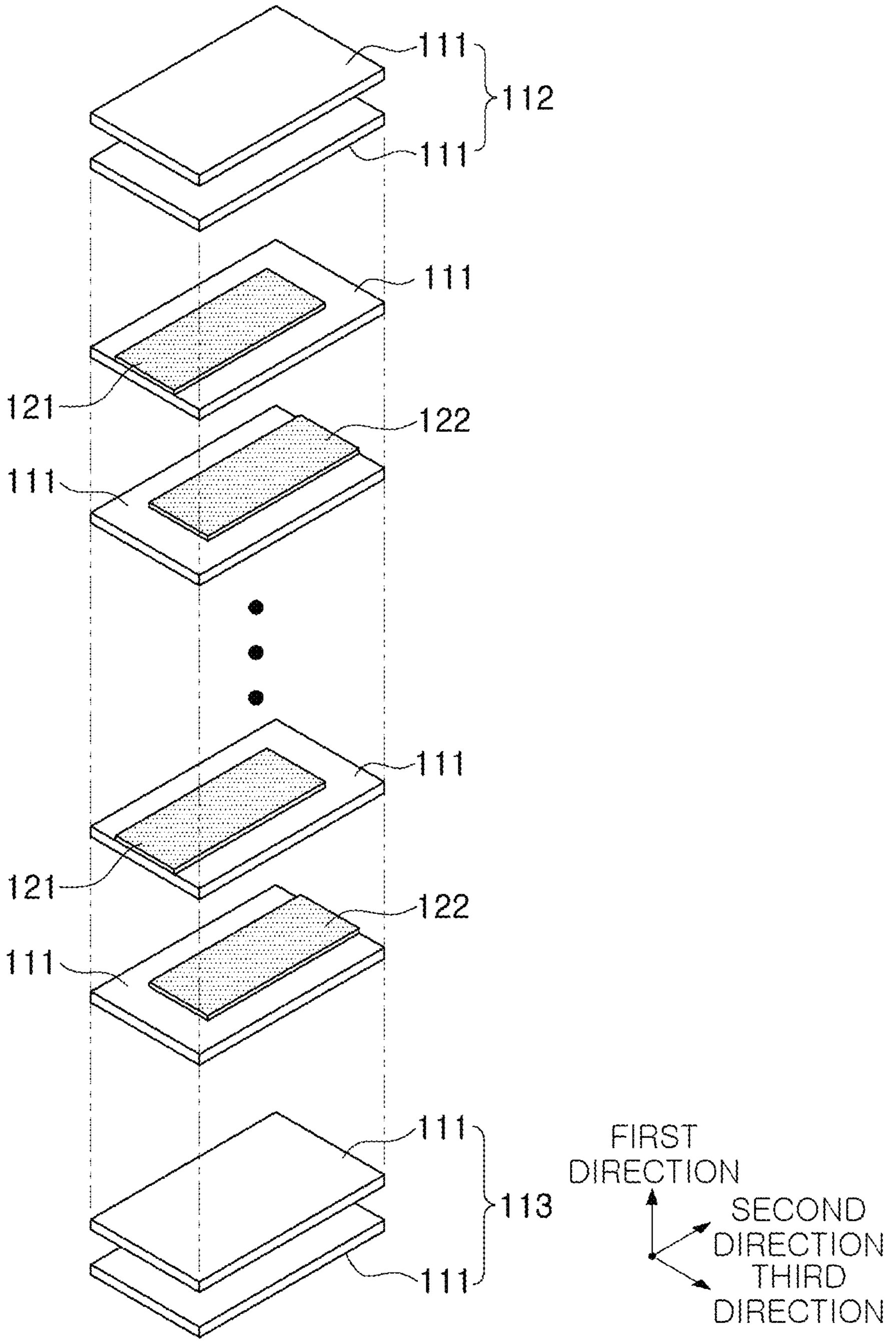
FIG. 4 schematically illustrates the body in a disassembled state.

FIG. 4 schematically illustrates the body in a disassembled state.

Figure 5:
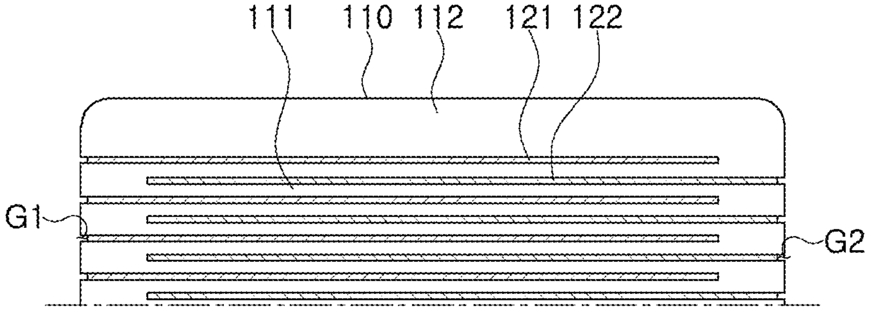
FIG. 5 schematically illustrates a portion of the body of FIG. 2.

FIG. 5 schematically illustrates a portion of the body of FIG. 2.

Figure 6:
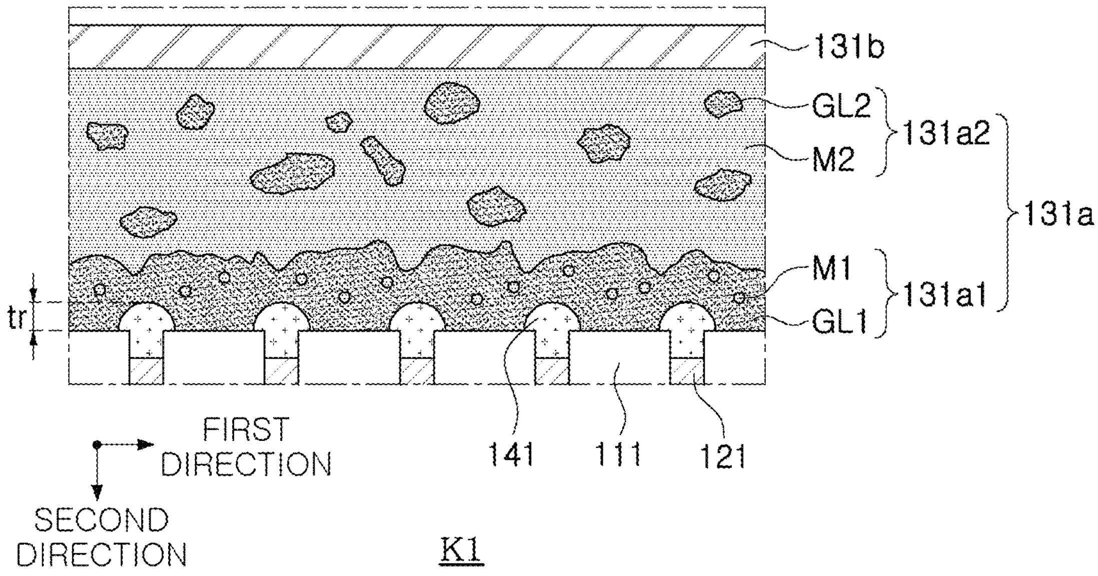
FIG. 6 is an enlarged view illustrating area K1 of FIG. 2.

FIG. 6 is an enlarged view illustrating area K1 of FIG. 2.

Hereinafter, a multilayer electronic component 100 according to an embodiment of the present disclosure will be described in detail with reference to FIGS. 1 to 6. A multilayer ceramic capacitor will be described as an example of a multilayer electronic component, but the present disclosure is not limited thereto, and may also be applied to various multilayer electronic components using a ceramic material, such as an inductor, a piezoelectric element, a varistor, a thermistor, or the like.

According to some embodiments of the present disclosure, the multilayer electronic component 100 may include: a body 110 including a dielectric layer 111 and internal electrodes 121 and 122 alternately disposed with the dielectric layer; interfacial plating layers 141 and 142 disposed at ends of the internal electrodes; and external electrodes 131 and 132 disposed to cover the interfacial plating layers and including electrode layers 131*a* and 132*a* including: glasses GL1 and GL2 containing Si and Al; and conductive metals M1 and M2, wherein the electrode layers may include an inner region 131*a*1 adjacent to the interfacial plating layers and an outer region 131*a*2 disposed on the inner region, and an area fraction of the glass GL1 included in the inner region may be higher than an area fraction of the glass GL2 included in the outer region.

In order to miniaturize a multilayer ceramic capacitor, there is a trend to reduce a thickness of an external electrode, and even if the thickness of the external electrode is reduced, a method is required to ensure reliability in a high temperature and high humidity environment.

Accordingly, a method was considered to change a glass component included in the electrode layer to glass containing Si and Al, which are plating-resistant glass which are effective in improving reliability by preventing penetration of a plating solution, moisture, and the like.

However, when glass containing Si and Al is applied to the electrode layer, deterioration in reliability due to penetration of a plating solution, moisture, and the like, may be prevented. But, when the electrode layer is sintered, the glass containing Si and Al was moved to an interface thereof with the body and oxidation at an end of an internal electrode was induced, so that a problem in that connectivity between the internal electrode and the external electrode is deteriorated may occur.

According to some embodiments of the present disclosure, the glass containing Si and Al is included in the electrode layer may be included, and an interfacial plating layer may be disposed at the end of the internal electrode. Thus, an oxidation at the end of the internal electrode may be suppressed, thereby improving reliability and improving connectivity between the internal electrode and external electrode.

Hereinafter, each component included in the multilayer electronic component 100 according to some embodiments of the present disclosure will be described.

The body 110 has a dielectric layer 111 and internal electrodes 121 and 122, alternately stacked therein.

The body 110 is not limited to a particular shape, and may have a hexahedral shape or a shape similar to the hexahedral shape, as illustrated in the drawings. The body 110 may not have a hexahedral shape having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces and 6 connected to the first and second surfaces 1 and 2, connected to the third and fourth surfaces 3 and 4, and opposing each other in a third direction.

As a margin region, in which the internal electrodes 121 and 122 are not disposed, overlaps the dielectric layer 111, a step may be formed by thicknesses of the internal electrodes 121 and 122, so that a corner connecting the first surface and the third to fifth surfaces and/or a corner connecting the second surface and the third to fifth surfaces may have a shape contracted to a center of the body 110 in the first direction when viewed with respect to the first surface or the second surface. Alternatively, by contraction behavior during a sintering process of the body, a corner connecting the first surface 1 and the third to sixth surfaces 3, 4, 5, and 6 and/or a corner connecting the second surface 2 and the third to sixth surfaces 3, 4, 5, to 6 may have a shape contracted to the center of the body 110 in the first direction when viewed with respect to the first surface or the second surface. Alternatively, as an edge connecting respective surfaces of the body 110 to each other is rounded by performing an additional process to prevent chipping defects, or the like, the corner connecting the first surface and the third to sixth surfaces and/or a corner connecting the second surface and the third to sixth surfaces may have a rounded shape.

Meanwhile, in order to suppress the step formed by the internal electrodes 121 and 122, after the internal electrodes are cut so as to be exposed to the fifth and sixth surfaces 5 and 6 of the body after stacking, when margin portions 114 and 115 are formed by stacking a single dielectric layer or two or more dielectric layers on both side surfaces of a capacitance formation portion Ac in a third direction (width direction), a portion connecting the first surface and the fifth and sixth surfaces and a portion connecting the second surface and the fifth and sixth surfaces may not have a contracted form.

A plurality of dielectric layers 111 forming the body 110 may be in a sintered state, and adjacent dielectric layers 111 may be integrated with each other, such that boundaries therebetween may not be readily apparent without using a scanning electron microscope (SEM). The number of stacked dielectric layers does not need to be particularly limited and can be determined considering the size of the stacked electronic component. For example, the body can be formed by stacking 400 or more dielectric layers.

The dielectric layer 111 may be formed by preparing a ceramic slurry containing ceramic powder, an organic solvent, and a binder, applying and drying the slurry on a carrier film to prepare a ceramic green sheet, and then sintering the ceramic green sheet. The ceramic powder is not particularly limited as long as sufficient electrostatic capacitance may be obtained therewith, but for example, barium titanate ($BaTiO_3$)-based powder may be used as the ceramic powder. For more specific examples, the ceramic powder particles may be, at least one selected from the group consisting of, $BaTiO_3$, $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), and $Ba(Ti_{1-y}Zr_y)O_3$ (0<y<1).

An average thickness "td" of the dielectric layer 111 is not particularly limited. For example, the average thickness "td" of the dielectric layer 111 may be 0.01 to 10 μm. In addition, the average thickness "td" of the dielectric layer 111 may be arbitrarily set according to desired characteristics or purposes. For example, in the case of small IT electronic components, in order to achieve miniaturization and high capacitance, the average thickness "td" of at least one of the plurality of dielectric layers 111 may be 0.4 μm or less.

Here, the average thickness "td" of the dielectric layer 111 may mean a size of the dielectric layer 111 disposed between the internal electrodes 121 and 122 in the first direction. The average thickness of the dielectric layer 111 may be measured by scanning a cross-section of the body 110 in the first and second directions with a scanning electron microscope (SEM) at a magnification of 10,000. More specifically, an average value may be measured by measuring a thickness of one dielectric layer 111 at multiple points, for example, at 30 points at equally spaced intervals in the second direction. The points at equally spaced intervals may be designated in a capacitance formation portion Ac to be described later. In addition, if the average value is measured by extending the average value measurement to 10 dielectric layers 111, the average thickness of the dielectric layers can be more generalized.

The body 110 may include a capacitance formation portion Ac disposed in the body 110, and including a first internal electrode 121 and a second internal electrode 122 disposed to oppose each other with the dielectric layer 111 interposed therebetween and having capacitance formed therein, and cover portions 112 and 113 formed above and below the capacitance formation portion Ac in the first direction.

In addition, the capacitance formation portion Ac is a portion serving to contribute to capacitance formation of a capacitor, and may be formed by repeatedly stacking a plurality of first and second internal electrodes 121 and 122 with a dielectric layer 111 interposed therebetween.

The cover portions 112 and 113 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by stacking a single dielectric layer or two or more dielectric layers on upper and lower surfaces of the capacitance formation portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover portion 113 may include a ceramic material, for example, a barium titanate ($BaTiO_3$)-based ceramic material.

Meanwhile, a thickness of the cover portions 112 and 113 is not particularly limited. However, in order to more easily achieve miniaturization and high capacitance of a multilayer electronic component, the average thickness "tc" of the cover portions 112 and 113 may be 15 μm or less.

The average thickness "tc" of the cover portions 112 and 113 may mean a size thereof in the first direction, and may be a value obtained by averaging sizes of the cover portions 112 and 113 in the first direction measured at five points having equal intervals above or below the capacitance formation portion Ac.

In addition, margin portions 114 and 115 may be disposed on a side surface of the capacitance formation portion Ac.

The margin portions 114 and 115 may include a first margin portion 114 disposed on the fifth surface 5 of the body 110 and a second margin portion 115 disposed on the sixth surface 6 thereof. That is, the margin portions 114 and 115 may be disposed on both end surfaces of the body 110 in a width direction.

The margin portions 114 and 115 may mean a region between both ends of the first and second internal electrodes 121 and 122 and an interface of the body 110 in a cross-section of the body 110 taken in a width-thickness (W-T) direction, as illustrated in FIG. 3.

The margin portions 114 and 115 may basically serve to prevent damage to the internal electrodes due to physical or chemical stresses.

The margin portions 114 and 115 may be formed by applying a conductive paste to the ceramic green sheet, except where margin portions are to be formed, to form an internal electrode.

In addition, in order to suppress a step formed by the internal electrodes 121 and 122, after the internal electrodes are cut so as to be exposed to the fifth and sixth surfaces 5 and 6 of the body after stacking, the margin portions 114 and 115 may also be formed by stacking a single dielectric layer or two or more dielectric layers on both side surfaces of the capacitance formation portion Ac in the third direction (width direction).

Meanwhile, a width of the margin portions 114 and 115 is not particularly limited. However, in order to more easily achieve miniaturization and high capacitance of a multilayer electronic component, an average width of the margin portions 114 and 115 may be 15 μm or less.

The average width of the margin portions 114 and 115 may mean an average size of a region in which the internal electrode is spaced apart from the fifth surface, in the third direction and an average size of a region in which the internal electrode is spaced apart from the sixth surface, in the third direction, and may be a value obtained by averaging sizes of the margin portions 114 and 115 in the third direction measured at five points at equally spaced intervals on a side surface of the capacitance formation portion Ac.

Accordingly, in some embodiments, the average size of the regions in which the internal electrodes 121 and 122 are spaced apart from the fifth and sixth surfaces in the third direction may be 15 μm or less, respectively.

Meanwhile, when a magnetic material is applied to the body 110 instead of a dielectric material, the multilayer electronic component may function as an inductor. The magnetic material may be, for example, ferrite and/or metallic magnetic particles. When the multilayer electronic component functions as an inductor, the internal electrode may be a coil-type conductor.

In addition, when a piezoelectric material is included in the body 110 instead of a dielectric material, the multilayer electronic component may function as a piezoelectric element. The piezoelectric material may be, for example, lead zirconate titanate (PZT).

In addition, when a ZnO-based or SiC-based material is included in the body 110 instead of a dielectric material, the multilayer electronic component may function as a varistor, and when a spinel-based material is included in the body 110 instead of a dielectric material, the multilayer electronic component may function as a thermistor.

That is, the multilayer electronic component 100 according to some embodiments of the present disclosure may function as an inductor, piezoelectric element, varistor, or thermistor as well as a multilayer ceramic capacitor, by appropriately changing the material or structure of the body 110.

The internal electrodes 121 and 122 may be disposed alternately with the dielectric layer 111. For example, the first internal electrode 121 and the second internal electrode 122, which are a pair of electrodes having different polarities, may be disposed to oppose each other with the dielectric layer 111 interposed therebetween. The first internal electrode 121 and the second internal electrode 122 may be electrically separated from each other by the dielectric layer 111 disposed therebetween. In this case, the internal electrodes 121 and 122 may be alternately disposed with the dielectric layer 111 in the first direction.

The first internal electrode 121 may be spaced apart from the fourth surface 4, but may extend toward the third surface 3. The second internal electrode 122 may be spaced apart from the third surface 3, but may extend toward the fourth surface 4. The first internal electrode 121 may be electrically connected to the first external electrode 131 on the third surface 3, and the second internal electrode 122 may be electrically connected to the second external electrode 132 on the fourth surface 4.

The conductive metal included in the internal electrodes 121 and 122 may be at least one selected from the group consisting of Ni, Cu, Pd, Ag, Au, Pt, Sn, W, Ti, and alloys thereof, and more preferably may include Ni, but the present disclosure is not limited thereto.

A method for forming internal electrodes 121 and 122 is not particularly limited. For example, the internal electrodes 121 and 122 may be formed by applying a conductive paste for internal electrodes containing a conductive metal on a ceramic green sheet and sintering the same. A method of applying the conductive paste for internal electrodes may be a screen-printing method or a gravure printing method, but the present disclosure is not limited thereto.

An average thickness "te" of the internal electrodes 121 and 122 is not particularly limited. For example, the average thickness "te" of the internal electrodes 121 and 122 may be 0.01 to 3 μm. In addition, the average thickness "te" of the internal electrodes 121 and 122 may be arbitrarily set according to desired characteristics or purposes. For example, in the case of small IT electronic components, in order to achieve miniaturization and high capacitance, the average thickness "te" of at least one of the plurality of internal electrodes 121 and 122 may be 0.4 μm or less.

Here, the average thickness "te" of the internal electrodes may be measured by scanning a cross-section of the body 110 in the first and second directions with a scanning electron microscope (SEM) at a magnification of 10,000. More specifically, an average value may be measured by measuring a thickness of one of internal electrodes 121 and 122 at multiple points, for example, at 30 points at equally spaced intervals in the second direction. The 30 points at equally spaced intervals may be designated in a capacitance formation portion Ac to be described later. In addition, if the average value is measured by extending the average value measurement to 10 internal electrodes 121 and 122, the average thickness of the internal electrodes 121 and 122 can be more generalized.

The external electrodes 131 and 132 may be disposed to cover the interfacial plating layers 141 and 142 and include electrode layers **131*a* and 132*a*** including glasses GL1 and GL2 containing Si and Al and conductive metals M1 and M2.

As illustrated in FIG. 2, the external electrodes 131 and 132 may include first and second external electrodes 131 and 132 respectively disposed on the third and fourth surfaces 3 and 4 of the body 110, and respectively connected to the first and second internal electrodes 121 and 122 through the interfacial plating layers 141 and 142. The first external electrode 131 may include a first electrode layer **131*a*, and the second external electrode 132 may include a second electrode layer 132*a***.

In the present embodiments, a structure in which the multilayer electronic component 100 has two external electrodes 131 and 132 is described, but the number and shape of the external electrodes 131 and 132 may be changed depending on the shape of the internal electrodes 121 and 122 or other purposes.

FIG. 6 is an enlarged view illustrating area K1 of FIG. 2.

The area K1 is illustrated by enlarging a part in which the first external electrode 131 is disposed, but the only difference is that the first external electrode 131 is disposed on the third surface, and the second external electrode 132 is disposed on the fourth surface, but the configurations of the first external electrode 131 and the second external electrode 132 are similar, so the following description will be provided based on the first external electrode 131, but this is considered to include the description of the second external electrode 132. In addition, the electrode layers **131*a* and 132*a* are described based on the first electrode layer 131*a*, but this is considered to include the description of the second electrode layer 132*a*. In addition, the interfacial electrode layers 141 and 142 are described based on the first interface electrode layer 141, but this is considered to include the description of the second interfacial electrode layer 142**.

Conventionally, Ba—Zn-based glass containing Ba and Zn was used as glass included in the electrode layer. However, since the Ba—Zn-based glass is easily soluble in a plating solution, when using Ba—Zn based glass, there may be a risk of a plating solution, moisture, or the like, penetrating into the internal electrodes. Also, when the thickness of the electrode layer is thin, there may be a problem with possibility of the plating solution, moisture, or the like, penetrating into the internal electrodes increased.

Accordingly, in the present disclosure, an attempt was made to improve moisture resistance reliability by including glass GL1 and GL2 containing Si and Al, having excellent plating resistance as compared to Ba—Zn-based glass, in the electrode layers **131*a* and 132*a***. Here, the glass GL1 and GL2 containing Si and Al may refer to aluminum silicate-based glass.

The glass GL1 and GL2 containing Si and Al had excellent plating resistance, but there was a concern that the glass may move to an interface with the internal electrodes during a sintering process and promote oxide formation at ends of the internal electrodes, leading to oxidation of the ends of the internal electrodes. Therefore, when the glass included in the electrode layer is changed from Ba—Zn-based glass to the glass GL1 and GL2 containing Si and Al, a problem of deteriorating the connectivity between the external electrode and the internal electrode may occur.

Referring to FIG. 6, the first electrode layer **131*a* includes an inner region 131*a*1 adjacent to the first interfacial plating layer 141 and an outer region 131*a*2 disposed on the inner region, and an area fraction of the glass GL1 included in the inner region 131*a*1 (an area % obtained by an area of the glass GL1 in the inner region 131*a*1** divided by an area of the inner region 131*a*1) is higher than an area fraction of the glass GL2 included in the outer region 131*a*2 (an area % obtained by an area of the glass GL2 in the outer region 131*a*2 divided by an area of the inner region 131*a*2). This is considered to be because the glass GL1 and GL2 containing Si and Al has excellent wettability with the body 110 and moves toward the body during the sintering process. As described above, when the area fraction of the glass GL1 included in the inner region 131*a*1 is higher than the area fraction of the glass GL2 included in the outer region 131*a*2, oxide formation may be promoted at the end of the internal electrode, so that oxidation at the end of the internal electrode may be induced, but according to the present disclosure, the interfacial plating layers 141 and 142 may be disposed at the ends of the internal electrodes 121 and 122 to prevent oxidation of the ends of the internal electrodes.

That is, according to some embodiments of the present disclosure, the interfacial plating layers 141 and 142 may be disposed at the ends of the internal electrodes 121 and 122 to suppress oxidation of the ends of the internal electrodes 121 and 122, thereby improving the reliability and the connectivity between the internal electrodes and the external electrodes. In addition, moisture resistance reliability can be secured even if the external electrodes 131 and 132 are formed to be thin, so capacitance per unit volume can be improved.

A relationship between the area fractions of glass included in the inner region 131*a* and the outer region 132*a* and respective values thereof are not particularly limited.

According to some embodiments, an area fraction of the glass GL1 included in the inner region 131*a*1 may be three times or more than an area fraction of the glass GL2 included in the outer region 131*a*2.

In addition, the area fraction of the glass GL1 included in the inner region 131*a*1 may be 80% or more, 85% or more, 90% or more, and the area fraction of the glass GL2 included in the outer region 131*a*2 may be 30% or less, 20% or less, or 10% or less.

Figure 11:
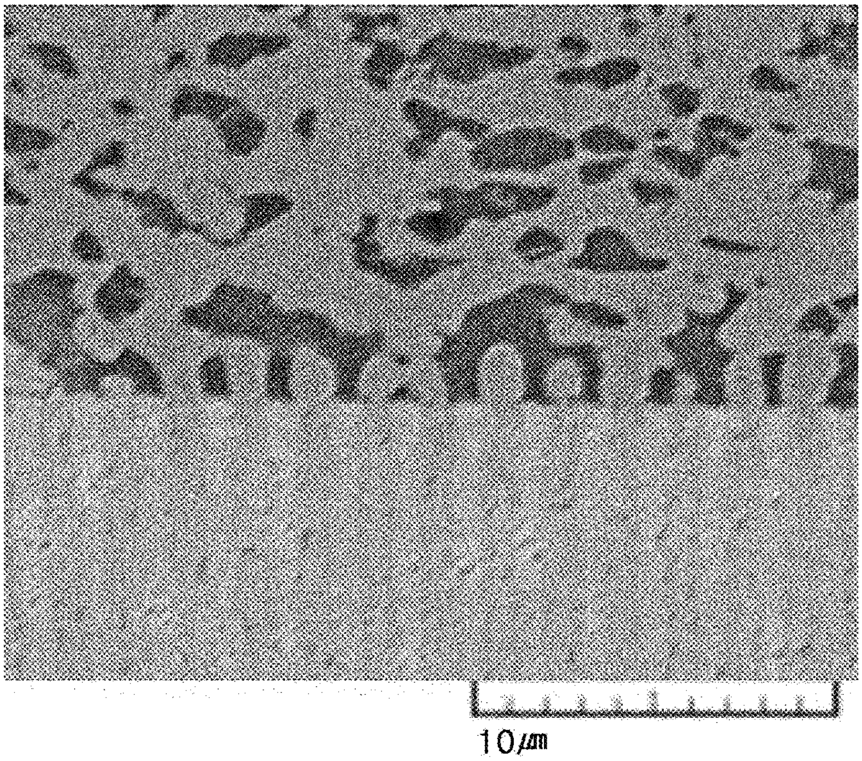
FIG. 11 is an image of a cross-section of a multilayer electronic component scanned with a scanning electron microscope in first and second directions according to an embodiment of the present disclosure.
Figure 12:
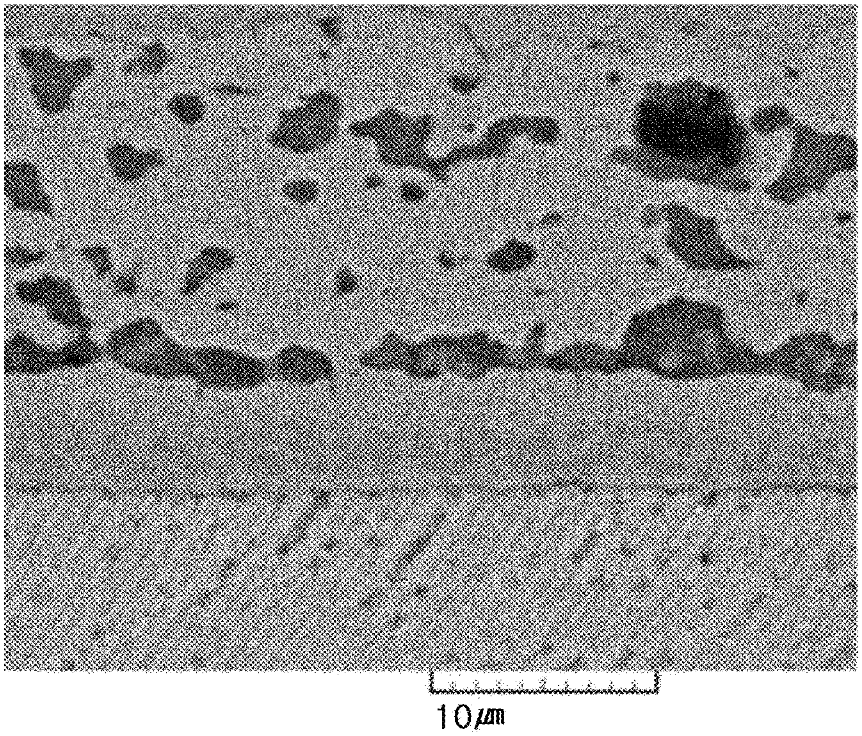
FIG. 12 is an image of a cross-section of a multilayer electronic component scanned with a scanning electron microscope in first and second directions according to a modified example of the present disclosure.

The area fraction of the glass included in the inner region 131*a*1 and the outer region 132*a*2 may be measured from an image of the electrode layers 131*a* and 132*a* scanned at a magnification of 1500 times or more using a scanning electron microscope (SEM) in a cross-section of the multilayer electronic component 100 in the first and second directions cut from a center of the body 110 in the third direction. Referring to FIGS. 11 and 12, glass and conductive metal may be clearly distinguished visually because there is a large contrast difference between glass and conductive metal in an image scanned by an SEM, and the area fraction may be obtained using an image analysis program. In addition, the metal of the interfacial plating layer 141 and the electrode layers 131*a* and 132*a* may be distinguished by performing elemental analysis using SEM-EDS.

Specifically, when the interfacial plating layer 141 has a semicircular shape, by selecting a region of 10 μm×2.5 μm (a size thereof in a first direction×a size thereof in a second direction) in a region within 5 μm in the second direction from the body 110 and scanning the same using SEM-EDS, and then measuring an area of glass (GLS1, unit: $\mu m^2$) and an area of the interfacial plating layer (PS, unit: $\mu m^2$) using an image analysis program, GLS1/(25 $\mu m^2$-PS)×100(%) may be taken as an area fraction of the glass of the inner region 131*a*1. Meanwhile, according to a modified example of the present disclosure, when the interfacial plating layer 141' has a layer shape, a region of 10 μm×2.5 μm (size in the first direction×second direction) may be selected in a region within 5 μm in the second direction from the interfacial plating layer 141'. However, an average thickness of the inner region 131*a*1 is less than 2.5 μm, a measured region may be set to have a size of 4 μm×1 μm (size in the first direction×size in the second direction).

For the area fraction of the glass of the outer region 131*a*2, a region of 10 μm×2.5 μm (size in the first direction×size in the second direction) may be selected in a region within 10 μm in the second direction from an outer surface of the electrode layer 131*a* and scanned using SEM-EDS, and then a glass area (GLS2, unit: $\mu m^2$) may be measured using an image analysis program, and GLS2/25 $\mu m^2$×100 (%) can be taken as the glass area fraction of the outer region 131*a*2.

Meanwhile, an area fraction of the conductive metal M1 included in the inner region 131*a*1 may be lower than an area fraction of the conductive metal M2 included in the outer region 131*a*2.

An average thickness of the inner region 131*a*1 may vary depending on sintering conditions, the type and type of the interfacial plating layer, and the like, but when general sintering conditions are applied, the average thickness of the inner region 131*a*1 may be 1 μm or more and 5 μm or less. The average thickness of the inner region 131*a*1 may be an average value of values measured at 10 points at equal intervals in the first direction in the image scanned by the SEM.

When the general sintering conditions are applied, the average thickness of the inner region 131*a*1 is 1 μm or more, so the area fraction of the glass included in the inner region may be 80% or more in a region within 1 μm from the interface with the interfacial plating layer.

In some embodiments, the glass GL1 and GL2 may further include Fe. When the glass GL1 and GL2 further contain Fe and the interfacial plating layers 141 and 142 does not exist, Fe contained in the glass GL1 and GL2 may move to the ends of the internal electrodes 121 and 122, so that Ni—Fe—O can be formed, and Ni—Fe—O can further promote oxidation of the ends of the internal electrodes 121 and 122. Therefore, when the glass GL1 and GL2 further include Fe, the effect of suppressing oxidation at the ends of the internal electrodes 121 and 122 according to the disposition of the interfacial plating layers 141 and 142 of the present disclosure may become more significant.

In some embodiments, the glass GL1 and GL2 may include at least one selected from the group consisting of $SiO_2$, $Al_2O_3$, and $Fe_2O_3$. In addition, Si, Al, and Fe included in the glasses GL1 and GL2 may be included in the form of $SiO_2$—$Al_2O_3$—$Fe_2O_3$.

In some embodiments, the glasses GL1 and GL2 may further include an alkaline oxide. The alkali oxide may lower a softening point by controlling the formation of an oxygen bridge in the glasses GL1 and GL2, thereby improving density of the electrode layer. Here, the density of the electrode layer refers to a degree to which pores are generated on the surface, when a void formed during sintering of a conductive metal during an electrode sintering process cannot be filled by glass softening behavior. When the surface density of the electrode is poor, pores may become a path for a plating solution to penetrate into the chip, so it is closely related to moisture resistance reliability.

For a specific example, the alkali oxide may include at least one of $Li_2O_3$ or $Na_2O_3$.

The interfacial plating layers 141 and 142 may be disposed at ends of the internal electrodes 121 and 122 to serve to improve electrical connectivity between the internal electrodes 121 and 122 and the external electrodes 131 and 132. In addition, oxidation of the ends of the internal electrodes

121 and 122 by the glass included in the electrode layers 131*a* and 132*a*, thereby improving the connectivity between the internal electrodes and the external electrodes. In addition, it can prevent the metal component of the electrode layers 131*a* and 132*a* from being diffused into the internal electrodes 121 and 122, thereby suppressing radiation cracks due to volume expansion of the internal electrodes.

The interfacial plating layers 141 and 142 may include a first interfacial plating layer 141 disposed at an end of the first internal electrode 121 and a second interfacial plating layer 142 disposed at an end of the second internal electrode 122.

In some embodiments, as illustrated in FIG. 5, the body 110 may include groove portions G1 and G2 in which the ends of the internal electrodes 121 and 122 are spaced apart from one surface of the body 110, and the interfacial plating layers 141 and 142 may include a first region disposed in the groove portions G1 and G2, respectively, and a second region protruding onto one surface of the body.

The groove portions G1 and G2 may be formed by a difference in shrinkage behavior between the internal electrodes 121 and 122 and the dielectric layer 111 during the sintering process of the body 110. When a sintering shrinkage rate of the internal electrodes 121 and 122 is greater than that of the dielectric layer 111, a problem in which the connectivity between the internal electrodes 121 and 122 and the external electrodes 131 and 132 is reduced due to the groove portions G1 and G2 may occur. In the conventional art, attempts were made to solve this problem by adding a process of removing the protruding dielectric layer using a sandblasting method, or the like. On the other hand, according to some embodiments of the present disclosure, since the interfacial plating layers 141 and 142 include a first region disposed in the groove portions G1 and G2 and a second region protruding onto one surface of the body, the connectivity between the internal electrodes 121 and 122 and the external electrodes 131 and 132 may be improved without a separate polishing process.

In some embodiments, in a cross-section of the multilayer electronic component 100 in the first and second directions, the second region may have a semicircular shape. In this case, the effect of improving connectivity between the internal electrodes 121 and 122 and the external electrodes 131 and 132 of the present disclosure may be secured while minimizing the interfacial plating layers 141 and 142.

In this case, when an average thickness of the internal electrode is te, an average thickness of the dielectric layer is td, and a radius of the semicircular shape is tr, $te/2 \leq tr \leq (te+td)/2$ may be satisfied. When the radius of the semicircular shape "tr" is less than te/2, the effect of improving connectivity between the external and internal electrodes may be insufficient, and when the radius of the semicircular shape "tr" is greater than (te+td)/2, the interfacial plating layers 141 and 142 may be connected to each other to form a single layer.

There is no need to specifically limit the specific value of the radius of the semicircular shape "tr" and may be, for example, 0.05 to 4 μm.

The radius of the semicircular shape "tr" may be measured by scanning a cross-section of the body 110 in the first and second directions with a scanning electron microscope SEM at a magnification of 10,000. In addition, the radius of the semicircular shape "tr" may be measured at any five interfacial electrode layers 141 and 142, and the average value may be used as a radius of the semicircular shape "tr."

Figure 7:
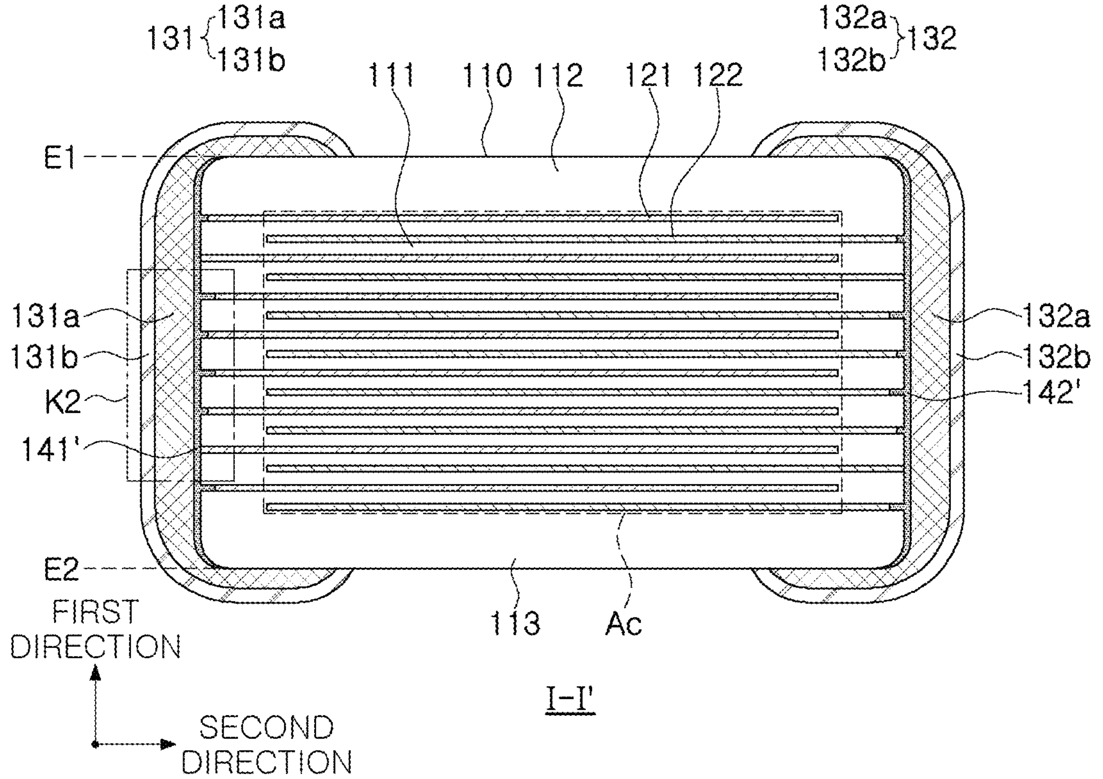
FIG. 7 is a diagram corresponding to FIG. 2 according to a modified example of the present disclosure.
Figure 8:
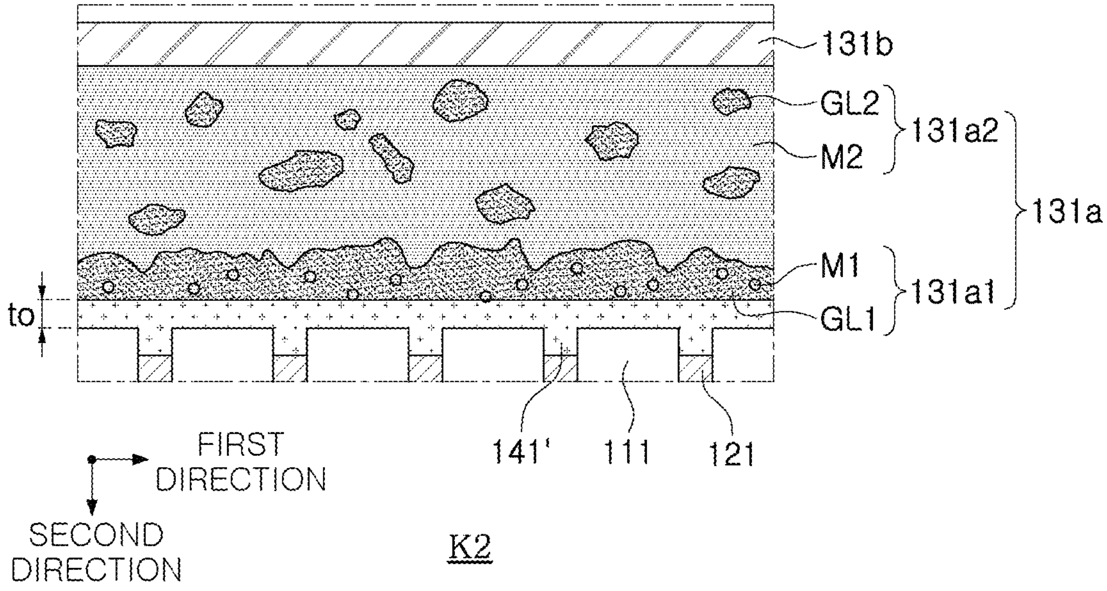
FIG. 8 is an enlarged view illustrating area K2 of FIG. 7.

However, a second region of the interfacial plating layers 141 and 142 is not limited to a semicircular shape, and as shown in FIGS. 7 and 8, according to a modified example of the present disclosure, a second region of interfacial plating layers 141' and 142' in a cross-sections of the multilayer electronic component 100 in the first and second directions may have a layer shape. As described above, when the second region of the interfacial plating layers 141' and 142' has a layer shape, the exposed portion of the internal electrode may be more reliably covered, the effect of improving connectivity between the internal electrodes 121 and 122 and the external electrodes 131 and 132 may be more reliably secured. In this case, the interfacial plating layers 141' and 142' may be disposed entirely between an extension line E1 of the first surface and an extension line E2 of the second surface.

In this case, an average thickness "to" of the interfacial plating layers 141' and 142' having a layer shape does not need to be particularly limited, and may be, for example, 1 to 10 μm, and more preferably 1 to 4 μm.

Here, the average thickness "to" of the interfacial plating layers 141' and 142' having a layer shape may mean an average thickness of the second region excluding the first region disposed inside the body.

Figure 9:
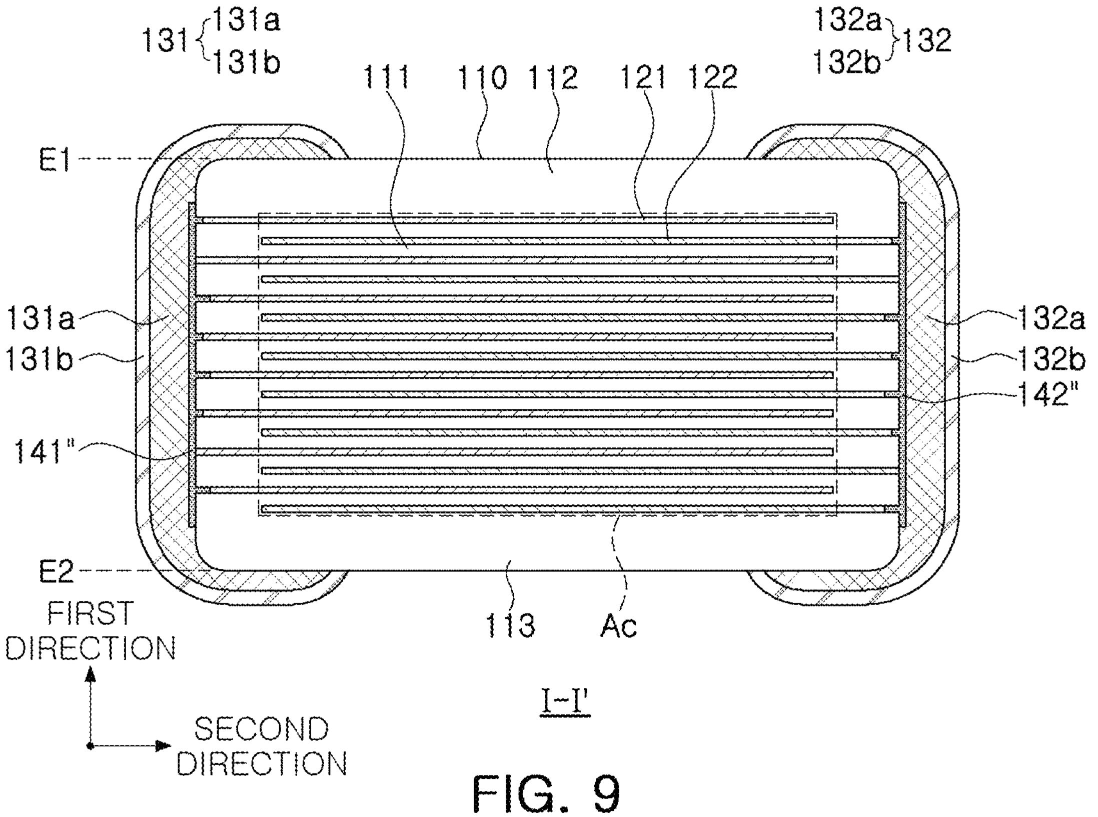
FIG. 9 is a diagram corresponding to FIG. 2 according to another modification of the present disclosure.

In addition, referring to FIG. 9, a first interfacial plating layer 141" may cover a portion of the third surface 3, and a second interfacial plating layer 142" may cover a portion of the fourth surface 4. That is, in this case, the interfacial plating layers 141" and 142" may be disposed partially between the extension line E1 of the first surface and the extension line E2 of the second surface. In this case, the interfacial plating layers 141" and 142" may be effectively disposed so that the effect of improving connectivity between the internal electrodes 121 and 122 and the external electrodes 131 and 132 may be secured.

Figure 10:
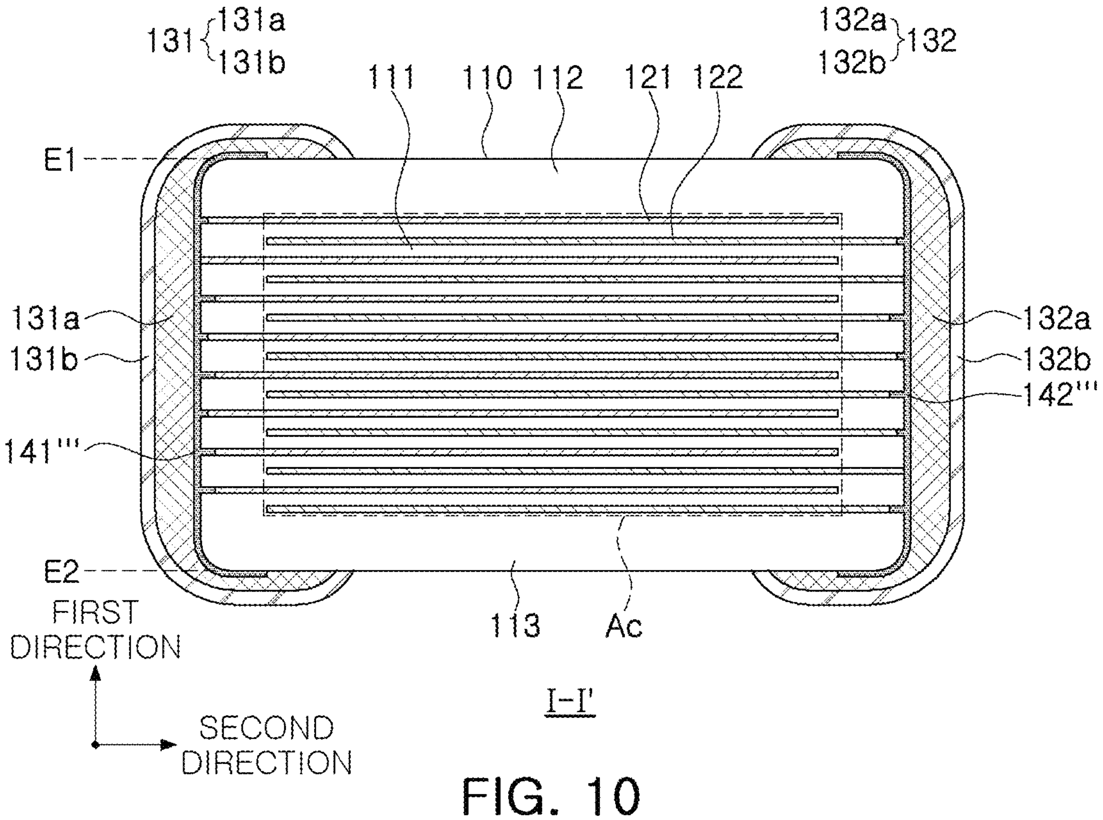
FIG. 10 is a diagram corresponding to FIG. 2 according to another modified example of the present disclosure.

In addition, referring to FIG. 10, a first interfacial plating layer 141''' may cover the third surface 3, a second interfacial plating layer 142''' may cover the fourth surface 4, and the first and second interfacial plating layers 141''' and 142''' may also extend on a portion of the first and second surfaces 1 and 2. In this case, as the interfacial plating layers 141''' and 142''' extend onto portions of the first and second surfaces 1 and 2, the interfacial plating layers 141''' and 142''' may cover an edge of the body, making it easy to secure a sufficient thickness of the external electrode at the edge of the body, thereby improving moisture resistance reliability.

In some embodiments, the interfacial plating layers 141 and 142 may have an amorphous structure. A crystalline structure may mean a structure has a three-dimensional lattice structure with long-range periodicity, so the crystalline structure means a structure that can express the lattice structure using symmetry elements such as translation, rotation, reflection, inversion, and the like. On the other hand, the amorphous structure does not have long-range periodicity, but may mean that atomic structures becoming basic units are connected and have a repetitive structure in a short-range order.

As the interfacial plating layers 141 and 142 have an amorphous structure, diffusion of the glass and metal components of the external electrodes 131 and 132 into the internal electrodes 121 and 122 may be more effectively prevented.

In some embodiments, the interfacial plating layers 141 and 142 may include Ni and one or more of P and B.

In some embodiments, the interfacial plating layers 141 and 142 may include Ni and/or P. accordingly, the interfacial plating layers 141 and 142 may be easily controlled to have an amorphous structure, and diffusion of glass and metal components of the external electrode to the internal electrode may be easily suppressed.

In some embodiments, a mass ratio of the P content to the Ni content included in the interfacial plating layers 141 and 142 may be 8% or more and 15% or less. When the mass ratio of the P content to the Ni content included in the interfacial plating layers 141 and 142 exceeds 15%, there may be a risk that equivalent series resistance (ESR) between the internal electrode and the external electrode increases, and when the mass ratio of the P content to the Ni content included in the interfacial plating layers 141 and 142 is less than 8%, as a thermal expansion coefficient of the interfacial plating layers 141 and 142 increases, a difference in thermal expansion coefficients with the body may increase at a high temperature, and thus, there may be a risk that the bonding strength between the interface plating layer and the body may weaken.

In some embodiments, the interfacial plating layers 141 and 142 may include Ni and/or B. Accordingly, the interfacial plating layers 141 and 142 can be easily controlled to have an amorphous structure, and diffusion of glass and metal components of the external electrode to the internal electrode can be easily suppressed.

In some embodiments, the mass ratio of the B content to the Ni content included in the interfacial plating layers 141 and 142 may be 2.5% or more and 10% or less. Accordingly, charge transfer resistance of the interfacial plating layers 141 and 142 may be increased to improve corrosion resistance due to exposure to external moisture, moisture penetration, and the like.

Meanwhile, the analysis of elements included in the interfacial plating layers 141 and 142 is performed by measuring a cross-section of the body 110 in the first and second directions passing through a center thereof in the third direction using scanning electron microscopy (SEM) and dispersive spectrometry (EDS). An average value of each element may be obtained by measuring the content of each element in a central portion of five or more interfacial plating layers 141 and 142 using EDS, and then a mass ratio of the P content to the Ni content or a mass ratio of the B content to the Ni content may be obtained using the average value.

The external electrodes 131 and 132 may include plating layers 131*b* and 132*b* disposed on the electrode layers 131*a* and 132*a*. The plating layers 131*b* and 132*b* may serve to improve mounting characteristics. The type of the plating layers 131*b* and 132*b* is not particularly limited, and may be plating layers containing one or more selected from the group consisting of Ni, Sn, Pd, and alloys thereof, and may be formed of a plurality of layers. For a more specific example of the plating layers 131*b* and 132*b*, the plating layers 131*b* and 132*b* may include a Ni plating layer or a Sn plating layer, and have a form in which the Ni plating layer and Sn plating layer are sequentially formed on the electrode layers 131*a* and 132*a*, and have a form in which the Sn plating layer, the Ni plating layer, and the Sn plating layer are sequentially formed thereon. In addition, the plating layers 131*b* and 132*b* may include a plurality of Ni plating layers and/or a plurality of Sn plating layers.

As set forth above, as one of the many effects of the present disclosure, reliability of a multilayer electronic component may be improved by including glass containing Si and Al in an electrode layer and disposing an interfacial plating layer at an end of an internal electrode.

As one of the many effects of the present disclosure, electrical connectivity between the internal electrode and the external electrode can be improved.

As one of the many effects of the present disclosure, capacitance per unit volume of a multilayer electronic component can be improved.

Although the embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression "one embodiment" "some embodiments" used in the present disclosure does not mean the same embodiment, and is provided to emphasize and describe different unique characteristics. However, one embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present disclosure as defined by the appended claims.

What is claimed is:

1. A multilayer electronic component, comprising:

a body including a dielectric layer and an internal electrode alternately disposed with the dielectric layer;

an interfacial plating layer disposed at one end of the internal electrode, which is closer to an outer surface of the body; and an external electrode disposed to cover the interfacial plating layer and a portion of the outer surface of the body on which the interfacial plating layer is not disposed, and including an electrode layer including glass containing Si and Al and a conductive metal, wherein the electrode layer includes an inner region adjacent to the interfacial plating layer and an outer region disposed on the inner region, and an area fraction of the glass included in the inner region is higher than an area fraction of the glass included in the outer region.

2. The multilayer electronic component of claim 1, wherein the area fraction of the glass included in the inner region is three times or more than the area fraction of the glass included in the outer region.

3. The multilayer electronic component of claim 1, wherein the area fraction of the glass included in the inner region is 80% or more, and the area fraction of the glass included in the outer region is 30% or less.

4. The multilayer electronic component of claim 1, wherein the area fraction of the glass included in the inner region is 80% or more in a region within 1 μm from an interface with the interfacial plating layer.

5. The multilayer electronic component of claim 1, wherein the inner region has an average thickness of 1 μm or more and 5 μm or less.

6. The multilayer electronic component of claim 1, wherein the glass further includes Fe.

7. The multilayer electronic component of claim 6, wherein the glass further includes at least one selected from the group consisting of $SiO_2$, $Al_2O_3$ and $Fe_2O_3$.

8. The multilayer electronic component of claim 1, wherein the glass further includes an alkaline oxide.

9. The multilayer electronic component of claim 8, wherein the alkaline oxide comprises one or more of $Li_2O_3$ or $Na_2O_3$.

10. The multilayer electronic component of claim 1, wherein the interfacial plating layer has an amorphous structure.

11. The multilayer electronic component of claim 1, wherein the interfacial plating layer comprises Ni and one or more of P or B.

12. The multilayer electronic component of claim 1, wherein the interfacial plating layer comprises Ni and P, and a mass ratio of a P content to a Ni content included in the interfacial plating layer is 8% or more and 15% or less.

13. The multilayer electronic component of claim 1, wherein the interfacial plating layer comprises Ni and B, and a mass ratio of a B content to the Ni content included in the interfacial plating layer is 2.5% or more and 10% or less.

14. The multilayer electronic component of claim 1, wherein the body comprises a groove portion in which an end of the internal electrode is spaced apart from one surface of the body, and the interfacial plating layer comprises a first region disposed in the groove portion and a second region protruding onto the outer surface of the body.

15. The multilayer electronic component of claim 14, wherein the internal electrode is alternately disposed with the dielectric layer in a first direction, and the body includes first and second surfaces opposing each other in the first direction, third and fourth surfaces connected to the first and second surfaces and opposing each other in a second direction, and fifth and sixth surfaces connected to the first to fourth surfaces and opposing each other in a third direction, and in a cross-section of the multilayer electronic component in the first and second directions, the second region has a semicircular shape.

16. The multilayer electronic component of claim 14, wherein the internal electrode is alternately disposed with the dielectric layer in a first direction, and the body includes first and second surfaces opposing each other in the first direction, third and fourth surfaces connected to the first and second surfaces and opposing each other in a second direction, and fifth and sixth surfaces connected to the first to fourth surfaces and opposing each other in a third direction, and in the cross-section of the multilayer electronic component in the first and second directions, the second region has a layer shape.

* * * * *